(12) United States Patent
Horie et al.

(10) Patent No.: US 11,293,655 B2
(45) Date of Patent: Apr. 5, 2022

(54) AIR-CONDITIONING APPARATUS AND AIR-CONDITIONING SYSTEM

(71) Applicant: Mitsubishi Electric Corporation, Tokyo (JP)

(72) Inventors: Hayato Horie, Tokyo (JP); Mamoru Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

(21) Appl. No.: 16/500,682

(22) PCT Filed: Jul. 5, 2017

(86) PCT No.: PCT/JP2017/024600
§ 371 (c)(1),
(2) Date: Oct. 3, 2019

(87) PCT Pub. No.: WO2019/008694
PCT Pub. Date: Jan. 10, 2019

(65) Prior Publication Data
US 2020/0200413 A1    Jun. 25, 2020

(51) Int. Cl.
*F24F 11/00*   (2018.01)
*F24F 3/044*   (2006.01)
(Continued)

(52) U.S. Cl.
CPC .......... *F24F 11/0008* (2013.01); *F24F 3/044* (2013.01); *F24F 3/14* (2013.01); *F24F 12/006* (2013.01); *F24F 2110/20* (2018.01)

(58) Field of Classification Search
CPC .. F24F 11/008; F24F 3/044; F24F 3/14; F24F 12/006; F24F 2110/20; F24F 11/86;
(Continued)

(56) References Cited

U.S. PATENT DOCUMENTS

| 2018/0306462 A1 | 10/2018 | Ito et al. |
| 2019/0011137 A1 | 1/2019 | Horie et al. |
| 2019/0086113 A1* | 3/2019 | Horie ...................... F24F 3/001 |

FOREIGN PATENT DOCUMENTS

| JP | H03-020545 A | 1/1991 |
| JP | H0413024 A * | 1/1992 |

(Continued)

OTHER PUBLICATIONS

Kiyotaki, All Atmospheric and Indoor Shared Use Type Air Conditioner, Jan. 17, 1992, JPH0413024A, Whole Document (Year: 1992).*

(Continued)

*Primary Examiner* — Larry L Furdge
(74) *Attorney, Agent, or Firm* — Posz Law Group, PLC

(57) ABSTRACT

An air-conditioning apparatus includes an air-to-air heat exchanger that transfers at least sensible heat between outdoor air and indoor air, an air-to-refrigerant heat exchanger provided in an air supply passage to transfer heat between the outdoor air and refrigerant, and a humidifier provided in part of the air supply passage that is located downstream of the air-to-refrigerant heat exchange. The humidifier humidifies the outdoor air. A communication passage causes part of the air exhaust passage that is located upstream of the air-to-air heat exchanger and part of the air supply passage that is located downstream of the air-to-air heat exchanger to communicate with each other. An opening/closing damper opens and closes the communication passage. A controller controls a refrigerant temperature in the air-to-refrigerant heat exchanger based on an indoor temperature, and controls operation of the opening/closing damper based on an indoor humidity.

2 Claims, 4 Drawing Sheets

(51) Int. Cl.
*F24F 3/14* (2006.01)
*F24F 12/00* (2006.01)
*F24F 110/20* (2018.01)

(58) Field of Classification Search
CPC .. F24F 2110/10; F24F 11/79; F24F 2012/007; Y02B 30/56; Y02B 30/70
See application file for complete search history.

(56) References Cited

FOREIGN PATENT DOCUMENTS

| | | | |
|---|---|---|---|
| JP | 2002-206778 A | | 7/2002 |
| JP | 2002206778 A | * | 7/2002 |
| JP | 2007-278592 A | | 10/2007 |
| JP | 2009287861 A | * | 12/2009 |
| JP | 4656357 B2 | | 3/2011 |
| JP | 2014059124 A | * | 4/2014 |
| JP | 2014126208 A | * | 7/2014 |
| WO | 2017/029741 A1 | | 2/2017 |
| WO | 2017/037816 A1 | | 3/2017 |

OTHER PUBLICATIONS

Kobayashi, Humidification and Ventilation Device, Dec. 10, 2009, JP2009287861A, Whole Document (Year: 2009).*
Mizuta, Air Conditioner, Jul. 26, 2002, JP2002206778A, Whole Document (Year: 2002).*
Osawa et al., Air Conditioning Control System and Air Conditioning Control Method, Apr. 3, 2014, JP2014059124A, Whole Document (Year: 2014).*
Yamamoto et al., Air Conditioning Method and Air Conditioning System, Jul. 7, 2014, JP2014126208A, Whole Document (Year: 2014).*
Office Action dated Nov. 10, 2020 issued in corresponding CN patent application No. 201780092461.8 (and English translation).
International Search Report of the International Searching Authority dated Sep. 12, 2017 for the corresponding International application No. PCT/JP2017/024600 (and English translation).
Extended European Search Report dated May 4, 2020 issued in corresponding EP patent application No. 17917165.7.

* cited by examiner

AIR-CONDITIONING APPARATUS AND AIR-CONDITIONING SYSTEM

CROSS REFERENCE TO RELATED APPLICATION

This application is a U.S. national stage application of PCT/JP2017/024600 filed on Jul. 5, 2017, the contents of which are incorporated herein by reference.

TECHNICAL FIELD

The present invention relates to an air-conditioning apparatus that processes an outside-air load, and an air-conditioning system including the air-conditioning apparatus.

BACKGROUND ART

Patent Literature 1 describes an air-conditioning apparatus including an air supply passage and an air exhaust passage that intersect each other at a heat exchanger. The air-conditioning device includes a humidifier provided in part of the air supply passage that is located downstream of the heat exchanger in a direction where air is sent, a bypass opening that causes the air exhaust passage to communicate with the air supply passage between the heat exchanger and the humidifier, the air exhaust passage being located upstream of the heat exchanger in the air-sending direction, an opening/closing unit that opens and closes the bypass opening, a unit that detects the humidity of indoor space, and a control unit that controls driving of the opening/closing unit in accordance with the detected humidity.

CITATION LIST

Patent Literature

Patent Literature 1: Japanese Patent No. 4656357

SUMMARY OF INVENTION

Technical Problem

In the air-conditioning apparatus described in Patent Literature 1, part of warm air in indoor space, which has not yet passed through the heat exchanger, flows to the humidifier through the bypass opening, and a humidification performance can thus be improved. In the case where a heating unit that heats air is provided upstream of the humidifier, heated air can be caused to flow through the humidifier. Therefore, the humidification performance of the air-conditioning apparatus can be further improved, and an indoor humidity can be promptly raised. However, Patent Literature 1 does not specifically describe a configuration in which the heating unit is provided upstream of the humidifier. Generally, when air is heated in a region located upstream of the humidifier, the temperature of air that is supplied into the indoor space is increased, and an indoor temperature is unnecessarily increased.

The present invention has been made to solve the above problem, and an object of the invention is to provide an air-conditioning apparatus and an air-conditioning system that are capable of promptly increasing the humidity of indoor space while preventing the temperature of the indoor space from being unnecessarily increased.

Solution to Problem

An air-conditioning apparatus according to an embodiment of the present invention includes a housing in which an air supply passage and air exhaust passage are provided, the air supply passage allowing flow of outdoor air to be supplied into an indoor space, the air exhaust passage allowing flow of indoor air to be exhausted to the outside of the indoor space; an air-to-air heat exchanger provided in the housing to transfer at least sensible heat between the outdoor air and the indoor air; an air-to-refrigerant heat exchanger provided in an air supply passage and forming part of a refrigerant circuit that circulates refrigerant, the air-to-refrigerant heat exchanger being provided to transfer heat between the outdoor air and the refrigerant; a humidifying device provided in part of the air supply passage that is located downstream of the air-to-refrigerant heat exchanger, the humidifying device being provided to humidify the outdoor air; a communication passage that causes part of the air exhaust passage that is located upstream of the air-to-air heat exchanger and part of the air supply passage that is located downstream of the air-to-air heat exchanger to communicate with each other; an opening/closing device that opens and closes the communication passage; and a control unit that controls a refrigerant temperature in the air-to-refrigerant heat exchanger based on an indoor temperature in the indoor space, and controls an operation of the opening/closing device based on an indoor humidity in the indoor space.

An air-conditioning system according to another embodiment of the present invention is an air-conditioning system including a first air-conditioning apparatus that processes an outside-air load, and supplies outdoor air into an indoor space; a second air-conditioning apparatus that processes a load inside the indoor space; and a system controller that controls the first air-conditioning apparatus and the second air-conditioning apparatus. The first air-conditioning apparatus is the air-conditioning apparatus according to the above-described embodiment of the present invention; the first air-conditioning apparatus is capable of performing a heating and humidifying operation in which the air-to-refrigerant heat exchanger operates as a condenser and the humidifying device performs humidification; the second air-conditioning apparatus includes a load-side heat exchanger forming part of a refrigerant circuit that circulates refrigerant; the second air-conditioning apparatus is capable of performing a cooling operation in which the load-side heat exchanger operates as an evaporator; and the system controller increases an evaporating temperature of the refrigerant circuit of the second air-conditioning apparatus, in the case where the first air-conditioning apparatus is performing the heating and humidifying operation, and the second air-conditioning apparatus is performing the cooling operation.

Advantageous Effects of Invention

Since the operation of the opening/closing device is controlled, part of indoor air whose humidity is relatively high as compared with outdoor air can be made to flow into the air supply passage through the communication passage, and to be supplied along with the outdoor air into the indoor space. Furthermore, since the refrigerant temperature in the air-to-refrigerant heat exchanger is also controlled, it is possible to raise the temperature of air in a region located upstream of the humidifying device. Therefore, according to the embodiments of the present invention, the indoor humidity can be further promptly raised. Furthermore, the refrigerant temperature in the air-to-refrigerant heat exchanger is controlled based on the indoor temperature. Therefore, according to the embodiments of the present invention, the indoor temperature can be prevented from being unnecessarily raised.

DESCRIPTION OF EMBODIMENTS

Embodiment 1

Figure 1:
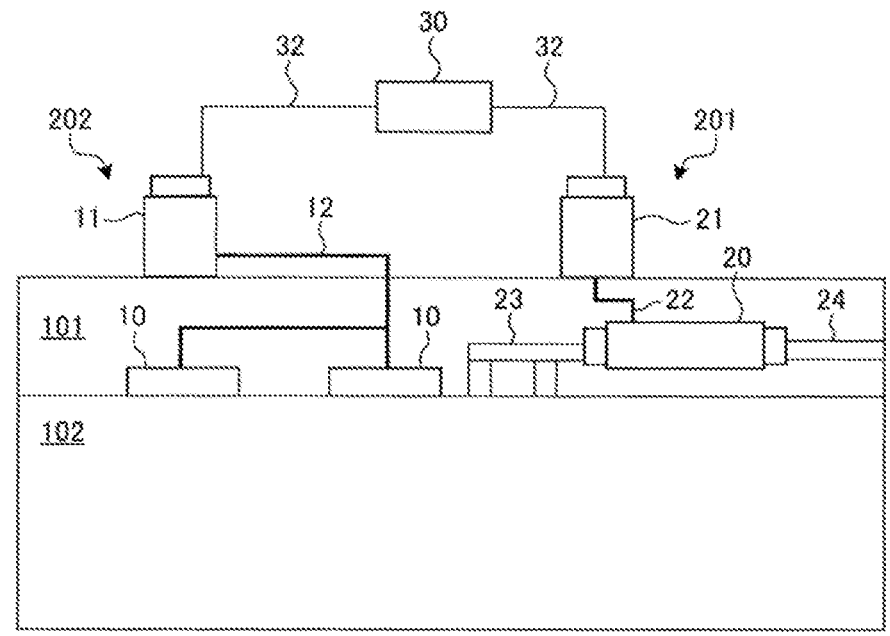
FIG. 1 is a schematic diagram illustrating a configuration of an air-conditioning system including a first air-conditioning apparatus 201 according to Embodiment 1 of the present invention.

An air-conditioning apparatus and an air-conditioning system according to Embodiment 1 of the present invention will be described. FIG. 1 is a schematic diagram illustrating a configuration of an air-conditioning system including a first air-conditioning apparatus 201 according to Embodiment 1. As illustrated in FIG. 1, the air-conditioning system includes a first air-conditioning apparatus 201 including an outside-air processing unit 20 and an outdoor unit 21, and a second air-conditioning apparatus 202 including a plurality of indoor units 10 and an outdoor unit 11. The outside-air processing unit 20 and the indoor units 10 are provided in space 101 above a ceiling. The outside-air processing unit 20 is connected to the outdoor unit 21 by a refrigerant pipe 22. The plurality of indoor units 10 are connected to the outdoor unit 11 by refrigerant pipes 12. The outdoor units 11 and 21 are provided outdoors. In the air-conditioning system, a heat load in indoor space 102 is subjected mainly to processing by the indoor units 10, and an outside-air load is subjected mainly to processing by the outside-air processing unit 20. The outside-air processing unit 20 may also be referred to as an outside-air conditioning unit. FIG. 1 illustrates a single outside-air processing unit 20, but the number of outside-air processing units 20 may be two or more. Furthermore, FIG. 1 illustrates two indoor units 10, but the number of indoor units 10 may be one, or may be three or more.

The outside-air processing unit 20 communicates with the indoor space 102 through an indoor duct 23. The indoor duct 23 includes an air supply duct that allows air from the outside-air processing unit 20 to be supplied into the indoor space, and an air return duct that allows air in the indoor space to return to the outside-air processing unit 20. The outside-air processing unit 20 communicates with outdoor space through an outdoor duct 24. The outdoor duct 24 includes an outside-air duct that allows outdoor air to be introduced into the outside-air processing unit 20, and an air exhaust duct that allows air from the outside-air processing unit 20 to be exhausted to the outdoor space.

The air-conditioning system includes a system controller 30 that controls the first air-conditioning apparatus 201 and the second air-conditioning apparatus 202. The system controller 30 includes a microcomputer including a CPU, a ROM, a RAM, an I/O port, etc. The system controller 30 is connected to the control unit 31 (not illustrated in FIG. 1) that controls the first air-conditioning apparatus 201 and a control unit that controls the second air-conditioning apparatus 202 by respective communication lines 32.

Figure 2:
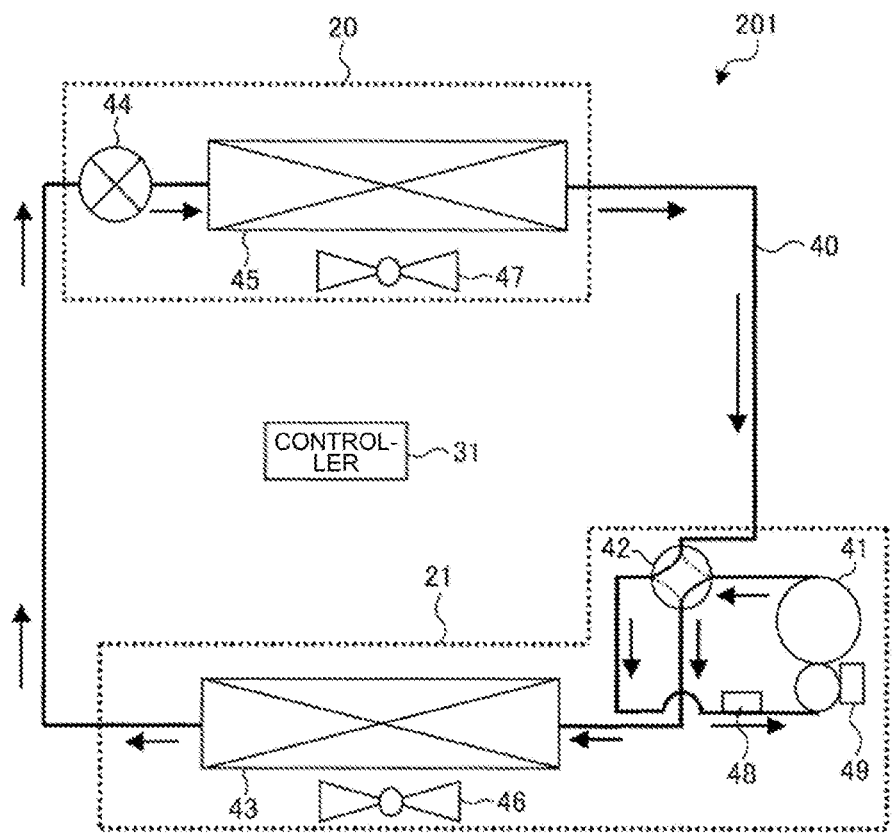
FIG. 2 is a refrigerant circuit diagram illustrating a configuration of the first air-conditioning apparatus 201 according to Embodiment 1 of the present invention.

FIG. 2 is a refrigerant circuit diagram illustrating a configuration of the first air-conditioning apparatus 201 according to Embodiment 1. As illustrated in FIG. 2, the first air-conditioning apparatus 201 includes a refrigerant circuit 40 that circulates refrigerant, and the control unit 31 that controls the refrigerant circuit 40. In the refrigerant circuit 40, a compressor 41, a four-way valve 42, a heat-source-side heat exchanger 43, an expansion valve 44, and a load-side heat exchanger 45 are sequentially connected. The compressor 41, the four-way valve 42, and the heat-source-side heat exchanger 43 are housed in the outdoor unit 21, and in addition an outdoor fan 46 that sends air to the heat-source-side heat exchanger 43 is also housed in the outdoor unit 21. The expansion valve 44 and the load-side heat exchanger 45 are housed in the outside-air processing unit 20, and in addition an air supply fan 47 that sends air to the load-side heat exchanger 45 is also housed in in the outside-air processing unit 20.

The compressor 41 is provided with a frequency adjusting unit 49 that adjusts a driving frequency of the compressor 41 under control by the control unit 31. That is, the driving frequency of the compressor 41 is controlled by the control unit 31. The four-way valve 42 is provided to switch the flow of refrigerant between the flow of refrigerant in a cooling operation and the flow of refrigerant in a heating operation, under the control by the control unit 31. Thereby, in the refrigerant circuit 40, the operation to be performed can be switched between the cooling operation in which the load-side heat exchanger 45 operates as an evaporator and the heating operation in which the load-side heat exchanger 45 operates as a condenser. In FIG. 2, arrows indicates the flow direction of the refrigerant during the cooling operation.

The heat-source-side heat exchanger 43 is an air-to-refrigerant heat exchanger that transfers heat between air sent by the outdoor fan 46 and refrigerant that flows in the air-to-refrigerant heat exchanger. The expansion valve 44 is a valve that reduces the pressure of refrigerant to expand the refrigerant. As the expansion valve 44, an electronic expansion valve whose opening degree can be adjusted under control by the control unit 31 is used. The load-side heat exchanger 45 is an air-to-refrigerant heat exchanger that transfers heat between air sent by the air supply fan 47 and refrigerant in the air-to-refrigerant heat exchanger.

An evaporating temperature sensor 48 is provided on a suction side of the compressor 41 of the refrigerant circuit 40. The evaporating temperature sensor 48 measures an evaporating temperature of refrigerant, and outputs a signal corresponding to a value obtained by measurement by the evaporating temperature sensor 48 to the control unit 31.

The control unit 31 includes a microcomputer including a CPU, a ROM, a RAM, an I/O port, etc. The control unit 31 controls the compressor 41, the four-way valve 42, the expansion valve 44, the outdoor fan 46, the air supply fan 47, etc. based on commands from the system controller 30, output signals from various sensors including the evaporating temperature sensor 48, and other signals. The control unit 31 may be provided at the outdoor unit 21 or at the outside-air processing unit 20. The control unit 31 may further include an outdoor-unit control unit provided at the outdoor unit 21, and an outside-air processing unit control unit provided at the outside-air processing unit 20 and capable of communicating with the outdoor-unit control unit.

Figure 3:
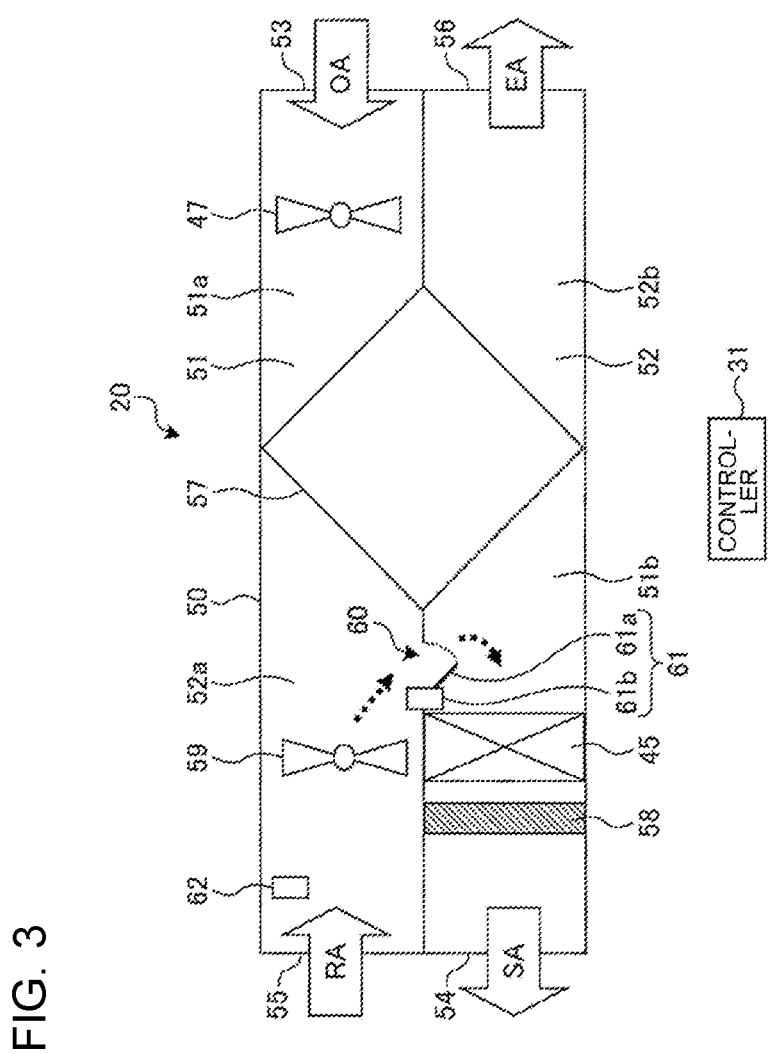
FIG. 3 is a schematic diagram illustrating a configuration of an outside-air processing unit 20 of the first air-conditioning apparatus 201 according to Embodiment 1 of the present invention.

FIG. 3 is a schematic diagram illustrating a configuration of the outside-air processing unit 20 of the first air-conditioning apparatus 201 according to Embodiment 1. As illustrated in FIG. 3, the outside-air processing unit 20 includes a housing 50. In the housing 50, an air supply passage 51 and an air exhaust passage 52 are provided. The air supply passage 51 is provided to circulate outdoor air to be supplied into the indoor space, and the air exhaust passage 52 is provided to circulate indoor air to be exhausted to the outside. The housing 50 is partitioned into the air supply passage 51 and the air exhaust passage 52, except for a communication passage 60 which will be described later. At an upstream end of the air supply passage 51, an outside-air introduction port 53 is provided to introduce outdoor air into the air supply passage 51. The outside-air introduction port 53 communicates with the outdoor space through the outside-air duct. In the following, outdoor air that is introduced from the outdoor space through the outside-air introduction port 53 may be referred to as "outside air OA". At a downstream end of the air supply passage 51, an air inlet 54 is provided to supply outdoor air into the indoor space. The air inlet 54 communicates with the indoor space through the air supply duct. In the following, outdoor air that is supplied into the indoor space through the air inlet 54 may be referred to as "supply air SA".

An air return port 55 that allows indoor air to be introduced into the air exhaust passage 52 is formed at an upstream end of the air exhaust passage 52. The air return port 55 is provided to connect with the indoor space through the air return duct. In the following, indoor air that is introduced from the indoor space through the air return port 55 may be referred to as "return air RA". An air exhaust port 56 that allows indoor air to be exhausted to the outdoor space is provided at a downstream end of the air exhaust passage 52. The air exhaust port 56 is provided to connect with the outdoor space through the air exhaust duct. In the following, indoor air that is exhausted to the outdoor space through the air exhaust port 56 may be referred to as "exhaust air EA."

In the housing 50, a total heat exchanger 57 is provided. The total heat exchanger 57 is provided to transfer sensible heat and latent heat between outdoor air that flows through the air supply passage 51 and indoor air that flows through the air exhaust passage 52. As the total heat exchanger 57, a static total heat exchanger or a rotary total heat exchanger can be used. In the case where a rotary total heat exchanger is used as the total heat exchanger 57, the operation of the total heat exchanger 57 is controlled by the control unit 31.

In the following, an upstream side of the air exhaust passage 51 that is located upstream of the total heat exchanger 57 may be referred to as an upstream-side air supply passage 51a. A downstream side of the air exhaust passage 51 that is located downstream of the total heat exchanger 57 may be referred to as a downstream-side air supply passage 51b. An upstream side of the air exhaust passage 52 that is located upstream of the total heat exchanger 57 may be referred to as an upstream-side air exhaust passage 52a. A downstream side of the air exhaust passage 52 that is located downstream of the total heat exchanger 57 may be referred to as a downstream-side air exhaust passage 52b.

In the upstream-side air supply passage 51a, the air supply fan 47 is provided. The air supply fan 47 is provided to produce in the air supply passage 51, a flow of air in a direction from the outside-air introduction port 53 toward the air inlet 54. The operation of the air supply fan 47 is controlled by the control unit 31.

In the downstream-side air supply passage 51b, the load-side heat exchanger 45 forming part of the refrigerant circuit 40 is provided. The load-side heat exchanger 45 operates as an evaporator that cools air during the cooling operation, and operates as a condenser that heats air during the heating operation.

A humidifying device 58 is provided on a downstream side of the downstream-side air supply passage 51b that is located downstream of the load-side heat exchanger 45. As the humidifying device 58, for example, an evaporative humidifier of a moisture permeable membrane type or of a drip evaporative type is used. The operation of the humidifying device 58 is controlled by the control unit 31. The outside-air processing unit 20 can perform a heating and humidifying operation in which the load-side heat exchanger 45 operates as a condenser, and the humidifying device 58 performs humidification. When the heating and humidifying operation is performed, air that is heated by the load-side heat exchanger 45 to have a high temperature is supplied to the humidifying device 58, and a high humidifying performance can thus be obtained.

In the upstream-side air exhaust passage 52a, an air exhaust fan 59 is provided. The air exhaust fan 59 is provided to produce in the air exhaust passage 52, a flow of air in a direction from the air return port 55 toward the air exhaust port 56. The operation of the air exhaust fan 59 is controlled by the control unit 31.

The communication passage 60 is formed between the upstream-side air exhaust passage 52a and the downstream-side air supply passage 51b. Through the communication passage 60, a downstream side of the upstream-side air exhaust passage 52a that is located downstream of the air exhaust fan 59 communicates with an upstream side of the downstream-side air supply passage 51b that is located upstream of the load-side heat exchanger 45. The communication passage 60 of Embodiment 1 is provided by forming an opening in a partition plate between the upstream-side air exhaust passage 52a and the downstream-side air supply passage 51b. Because of provision of the communication passage 60, part of indoor air that flows through the upstream-side air exhaust passage 52a does not flow into the total heat exchanger 57, but flows through the communication passage 60 into the downstream-side air supply passage 51b, and joins outdoor air at a location upstream of the load-side heat exchanger 45. It should be noted that a positional relationship between the communication passage 60, the load-side heat exchanger 45, and the humidifying device 58 is not particularly limited. That is, it suffices that the communication passage 60 is provided to cause the upstream-side air exhaust passage 52a and the downstream-side air supply passage 51b to communicate with each other.

At the communication passage 60, a damper 61 is provided to open and close the communication passage 60. The damper 61 is provided with a plate member 61a that includes a rotation shaft at its one end, and a drive unit 61b that rotates the plate member 61a around the rotational shaft. The operation of the damper 61 is controlled by the control unit 31. An opening degree of the damper 61 may be controlled to be changed in two stages such that the damper 61 can be set in an opened state and a closed state, or may be controlled to be changed continuously or in multiple stages, that is, in three or more stages.

A temperature and humidity sensor 62 is provided in the upstream-side air exhaust passage 52a. The temperature and humidity sensor 62 measures a temperature and humidity of the return air RA as an indoor temperature and indoor humidity, respectively, and outputs signals corresponding to respective measurement values, that is, the measured temperature and humidity, to the control unit 31. A temperature sensor and a humidity sensor may be provided as separate elements. Furthermore, the control unit 31 may acquire information on the indoor temperature and the indoor humidity from the outside of the first air-conditioning apparatus 201.

An operation of the outside-air processing unit 20 in the case where the damper 61 is in the closed state will be described. It is assumed that the outside-air processing unit 20 is performing the heating and humidifying operation. In the air exhaust passage 52, a flow of air from the air return port 55 toward the air exhaust port 56 is produced by the air exhaust fan 59. Thereby, indoor air is sucked as the return air RA into the upstream-side air exhaust passage 52a through the air return duct and the air return port 55. The sucked indoor air flows through the upstream-side air exhaust passage 52a, and flows into the total heat exchanger 57. The indoor air having flowed out of the total heat exchanger 57 flows through the downstream-side air exhaust passage 52b, and is exhausted as the exhaust air EA to the outdoor space through the air exhaust port 56 and the air exhaust duct.

By contrast, in the air supply passage 51, a flow of air from the outside-air introduction port 53 toward the air inlet 54 is produced by the air supply fan 47. Thereby, outdoor air is sucked as the outside air OA into the upstream-side air supply passage 51a through the outside-air duct and the outside-air introduction port 53. The sucked outdoor air flows through the upstream-side air supply passage 51a, and flows into the total heat exchanger 57. The outdoor air having flowed into the total heat exchanger 57 collects sensible heat and latent heat of the indoor air through total heat exchange with the indoor air, and flows out of the total heat exchanger 57. The outdoor air having flowed out of the total heat exchanger 57 flows through the downstream-side air supply passage 51b, and is heated at the load-side heat exchanger 45 through heat exchange with refrigerant, and is then humidified at the humidifying device 58. The heated and humidified outdoor air is supplied as the supply air SA into the indoor space through the air inlet 54 and the air supply duct.

Next, an operation of the outside-air processing unit 20 in the case where the damper 61 is in the opened state will be described. When the damper 61 is set in the opened state, part of the indoor air that flows through the upstream-side air exhaust passage 52a flows into the downstream-side air supply passage 51b through the communication passage 60, as indicated by dashed arrows in FIG. 3, without flowing into the total heat exchanger 57. The indoor air having flowed into the downstream-side air supply passage 51b joins and mixes with outdoor air having passed through the total heat exchanger 57. Air that is mixture of the indoor air and the outdoor air is heated at the load-side heat exchanger 45 through heat exchange with refrigerant, and is then humidified at the humidifying device 58. The heated and humidified air is supplied as the supply air SA into the indoor space through the air inlet 54 and the air supply duct.

Figure 4:
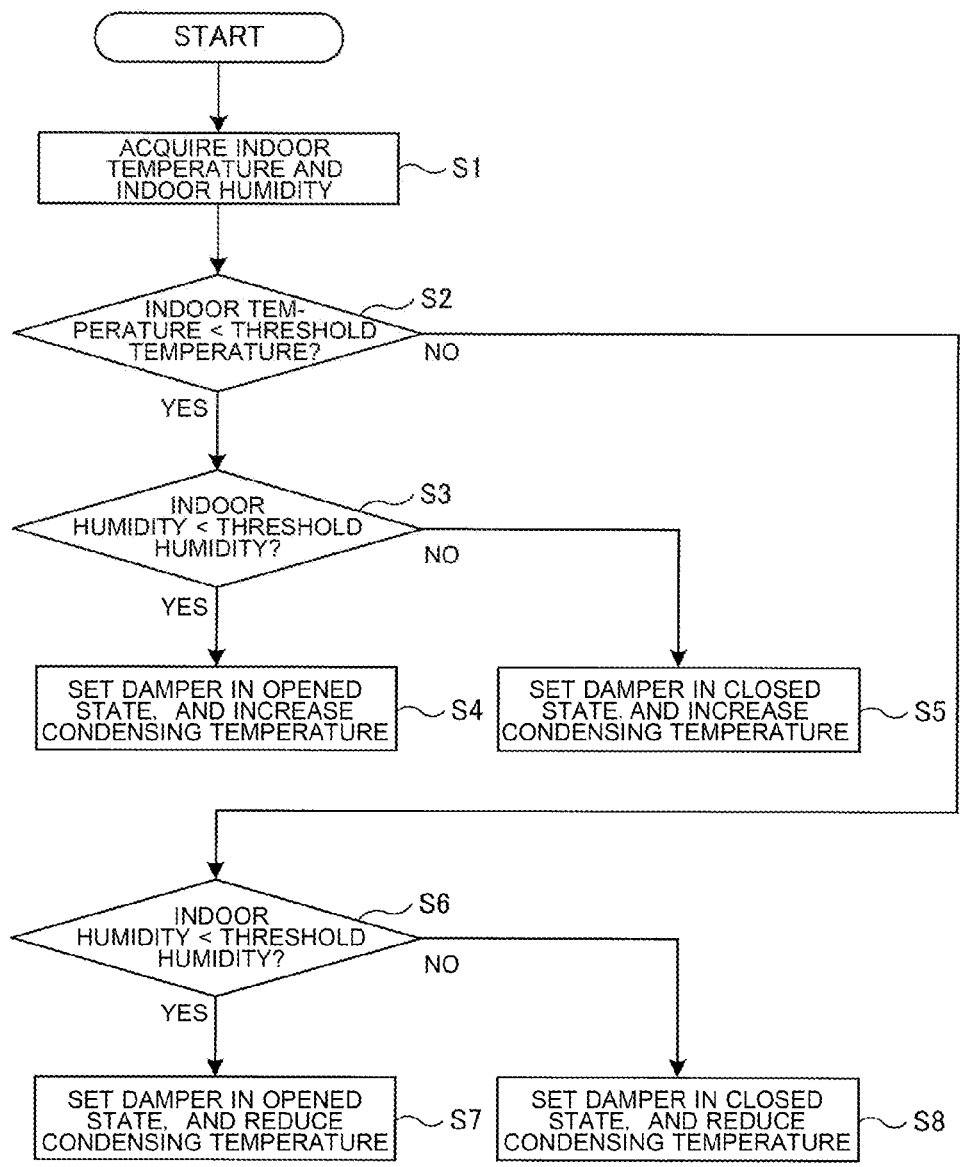
FIG. 4 is a flowchart illustrating an example of control by a control unit 31 of the first air-conditioning apparatus 201 according to Embodiment 1 of the present invention.

FIG. 4 is a flowchart indicating an example of control by the control unit 31 of the first air-conditioning apparatus 201 according to Embodiment 1. Control as indicated in FIG. 4 is performed during the heating and humidifying operation or the heating operation by the outside-air processing unit 20. First, the control unit 31 acquires an indoor temperature and indoor humidity based on input signals from the temperature and humidity sensor 62 (step S1).

Subsequently, in step S2, the control unit 31 compares the acquired indoor temperature with a threshold temperature set in advance. In the case where the indoor temperature is lower than the threshold temperature, the process proceeds to step S3, and in the case where the indoor temperature is higher than or equal to the threshold temperature, the process proceeds to step S6.

In step S3, the control unit 31 compares the acquired indoor humidity with a predetermined threshold humidity. The threshold humidity is set to a lower value than a set humidity that is a target control value for an indoor humidity. For example, in the case where the set humidity is RH50%, the threshold humidity is set to RH40%. In the case where the indoor humidity is lower than the threshold humidity, the process proceeds to step S4, and in the case where the indoor humidity is higher than or equal to the threshold humidity, the process proceeds to step S5.

In step S4, the control unit 31 causes the damper 61 to be set in the opened state. Also the control unit 31 controls an operation of the refrigerant circuit 40 that includes the driving frequency of the compressor 41, to increase a condensing temperature of the refrigerant in the load-side heat exchanger 45.

In step S5, the control unit 31 causes the damper 61 to be set in the closed state. Also, the control unit 31 controls the operation of the refrigerant circuit 40 that includes the driving frequency of the compressor 41, to increase the condensing temperature of the refrigerant in the load-side heat exchanger 45.

In step S6, the control unit 31 compares the acquired indoor humidity with the predetermined threshold humidity. In the case where the indoor humidity is lower than the threshold humidity, the process proceeds to step S7, and in the case where the indoor humidity is higher than or equal to the threshold humidity, the process proceeds to step S8.

In step S7, the control unit 31 causes the damper 61 to be set in the opened state. Also, the control unit 31 controls the operation of the refrigerant circuit 40 that includes the driving frequency of the compressor 41, to reduce the condensing temperature of the refrigerant in the load-side heat exchanger 45.

In step S8, the control unit 31 causes the damper 61 to be set in the closed state. Also, the control unit 31 controls the operation of the refrigerant circuit 40 that includes the driving frequency of the compressor 41, to reduce the condensing temperature of the refrigerant in the load-side heat exchanger 45.

As described above, in Embodiment 1, the operation of the refrigerant circuit 40 is controlled based on the indoor temperature, and the operation of the damper 61 is controlled based on the indoor humidity. In the case where the indoor temperature is lower than the threshold temperature, the refrigerant circuit 40 is controlled such that the condensing temperature of the refrigerant in the load-side heat exchanger 45 is increased (steps S4 and S5). Thereby, the amount of heat that is transferred to air at the load-side heat exchanger 45 is increased, and the temperature of the supply air SA is raised. In the case where the indoor temperature is higher than or equal to the threshold temperature, the refrigerant circuit 40 is controlled such that the condensing temperature of the refrigerant in the load-side heat exchanger 45 is reduced (steps S7 and S8). Thereby, the amount of heat that is transferred to the air at the load-side heat exchanger 45 is reduced, and the temperature of the supply air SA is reduced.

Furthermore, in the case where the indoor humidity is lower than the threshold humidity, the damper 61 is set in the opened state (steps S4 and S7). Since the threshold humidity is set to a lower value than the set humidity, the indoor humidity is normally higher than or equal to the threshold humidity during normal operation of the outside-air processing unit 20. On the other hand, immediately after the operation of the outside-air processing unit 20 is started, the indoor humidity may be lower than the threshold humidity. The indoor humidity is normally higher than the humidity of outdoor air even when the indoor humidity is lower than the threshold humidity. When the damper 61 is set in the opened state, part of the return air RA whose humidity is relatively high as compared with the outdoor air is mixed with the outdoor air to become the supply air SA, and the supply air SA has a high humidity. On the other hand, in the case where the indoor humidity is higher than equal to the threshold humidity, the damper 61 is set in the closed state (steps S5 and S8). This prevents an increase in the humidity of the supply air SA due to mixture of the supply air SA and the return air RA.

It should be noted that in the case where the opening degree of the damper 61 is controlled continuously or in multiple stages, the opening degree of the damper 61 may be controlled based on a value ΔRH obtained by subtracting the indoor humidity from the threshold humidity. In this case, the opening degree of the damper 61 is controlled such that the greater the ΔRH, the greater the opening degree of the damper 61, and the smaller the ΔRH, the smaller the opening degree of the damper 61. Thereby, the amount of indoor air that is mixed with the outdoor air in the downstream-side air supply passage 51b increases as the ΔRH increases.

Furthermore, in Embodiment 1, a specific command to improve an energy saving performance may be transmitted to the control unit 31 from, for example, the outside of the system controller 30 or an operation unit that operates the outside-air processing unit 20. When receiving such a command, the control unit 31 controls the compressor 41 such that the condensing temperature in the load-side heat exchanger 45 is kept constant at a value smaller than a normal value, and also controls the opening degree of the damper 61 based on the value ΔRH obtained by subtracting the indoor humidity from the threshold humidity.

As described above, the first air-conditioning apparatus 201 according to Embodiment 1 includes: the housing 50 in which the air supply passage 51 and the air exhaust passage 52 are provided, the air supply passage 51 allowing flow of outdoor air to be supplied into the indoor space, the air exhaust passage 52 allowing flow of indoor air to be exhausted to the outside of the indoor space; the total heat exchanger 57 provided in the housing 50 to transfer at least sensible heat between the outdoor air and the indoor air; the load-side heat exchanger 45 provided at the air supply passage 51 and forming part of the refrigerant circuit 40 that circulates refrigerant, the load-side heat exchanger 45 being provided to transfer heat between the outdoor air and the refrigerant; the humidifying device 58 provided to humidify the outdoor air and provided in part of the air supply passage 51 that is located downward of the load-side heat exchanger 45; the communication passage 60 that causes part of the air exhaust passage 52 that is located upstream of the total heat exchanger 57 and part of the air supply passage 51 that is located downstream of the total heat exchanger 57 to communicate with each other; the damper 61 that opens and closes the communication passage 60; and the control unit 31 that controls a refrigerant temperature in the load-side heat exchanger 45 based on an indoor temperature in the indoor space, and also controls the operation of the damper 61 based on an indoor humidity in the indoor space. It should be noted that the first air-conditioning apparatus 201 is an example of an air-conditioning apparatus. The total heat exchanger 57 is an example of an air-to-air heat exchanger. The load-side heat exchanger 45 is an example of an air-to-refrigerant heat exchanger. The damper 61 is an example of an opening/closing device.

In the above configuration, since the operation of the damper 61 is controlled based on an indoor humidity, and part of indoor air whose humidity is relatively high as compared with that of outdoor air can be made to flow into the air supply passage 51 through the communication passage 60 and to be supplied along with the outdoor air into the indoor space. It is therefore possible to more promptly raise the indoor humidity. Furthermore, the refrigerant temperature in the load-side heat exchanger 45 is controlled based on the indoor temperature, and the temperature of air in a region located upstream of the humidifying device 58 can be raised. Therefore, the indoor temperature and the indoor humidity can be more promptly raised. Thus, especially, immediately after the operation of the first air-conditioning apparatus 201 is started, the indoor temperature and the indoor humidity can be made to promptly reach respective target values. On the other hand, the refrigerant temperature in the load-side heat exchanger 45 is controlled based on the indoor temperature. Therefore, the indoor temperature can be prevented from being unnecessarily raised, and wasteful energy consumption can thus be reduced.

In the first air-conditioning apparatus 201 according to Embodiment 1, the control unit 31 may perform the control in the following manner: in the case where the indoor temperature is higher than or equal to the threshold temperature, the control unit 31 controls the refrigerant circuit 40 to reduce the refrigerant temperature in the load-side heat exchanger 45; in the case where the indoor temperature is lower than the threshold temperature, the control unit 31 controls the refrigerant circuit 40 to raise the refrigerant temperature in the load-side heat exchanger 45; in the case where the indoor humidity is higher than or equal to the threshold humidity, the control unit 31 causes the damper 61 to be set in the closed state; and in the case where the indoor humidity is lower than the threshold humidity, the control unit 31 causes the damper 61 to be set in the opened state.

In the first air-conditioning apparatus 201 according to Embodiment 1, in the case where the indoor humidity is lower than the threshold humidity, the control unit 31 may control the opening degree of the damper 61 based on the value ΔRH obtained by subtracting the indoor humidity from the threshold humidity. In this configuration, the greater the ΔRH, the larger the amount of indoor air that flows through the communication passage 60 and is mixed with the outdoor air, and the smaller the ΔRH, the smaller the amount of the above indoor air. It is therefore possible to more promptly raise the indoor humidity while reducing the amount of indoor air that is mixed with the outdoor air as much as possible.

In the first air-conditioning apparatus 201 according to Embodiment 1, when receiving a specific command from the outside, the control unit 31 may control the refrigerant circuit 40 such that the refrigerant temperature in the load-side heat exchanger 45 is kept constant, and control the opening degree of damper 61 based on the value ΔRH obtained by subtracting the indoor humidity from the threshold humidity. In this configuration, even in the case where the control of keeping the condensing temperature at the refrigerant circuit 40 constant is effective, the amount of indoor air to be mixed with the outdoor air is controlled based on the ΔRH, and the indoor humidity can thus be more promptly raised.

Embodiment 2

An air-conditioning system according to Embodiment 2 of the present invention will be described. As in Embodiment 1, the air-conditioning system according to Embodiment 2 also includes the first air-conditioning apparatus 201 provided with the outside-air processing unit 20 and the outdoor unit 21, the second air-conditioning apparatus 202 provided with at least one indoor unit 10 and the outdoor unit 11, and the system controller 30 that controls the first air-conditioning apparatus 201 and the second air-conditioning apparatus 202. A heat load in the indoor space 102 is processed mainly by a plurality of the indoor units 10, and an outside-air load is processed mainly by the outside-air processing unit 20.

The second air-conditioning apparatus 202 includes a refrigerant circuit that circulates refrigerant and that is separate from the refrigerant circuit 40 of the first air-conditioning apparatus 201. At least the heat-source-side heat exchanger of the refrigerant circuit is housed in the outdoor unit 21, and at least the load-side heat exchanger of the refrigerant circuit is housed in the indoor unit 10. The second air-conditioning apparatus 202 is capable of performing the cooling operation in which the load-side heat exchanger operates as an evaporator, and the heating operation in which the load-side heat exchanger operates as a condenser.

Figure 5:
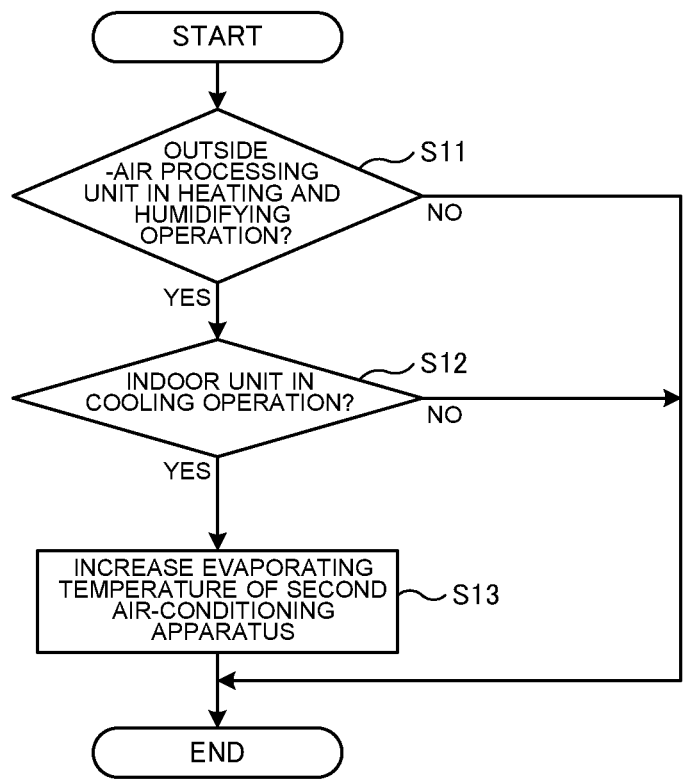
FIG. 5 is a flowchart illustrating an example of control by a system controller 30 of an air-conditioning system according to Embodiment 2 of the present invention.

FIG. 5 is a flowchart illustrating an example of control by the system controller 30 of the air-conditioning system according to Embodiment 2. In step S11 as indicated in FIG. 5, the system controller 30 determines whether the outside-air processing unit 20 of the first air-conditioning apparatus 201 is performing the heating and humidifying operation or not. In the case where the outside-air processing unit 20 is performing the heating and humidifying operation, the process proceeds to step S12, and in the case where the outside-air processing unit is not performing the heating and humidity operation, the process is ended.

In step S12, the system controller 30 determines whether the indoor unit 10 of the second air-conditioning apparatus 202 is performing the cooling operation or not. In the case where the indoor unit 10 is performing the cooling operation, the process proceeds to step S13, and in the case where the indoor unit 10 is not performing the cooling operation, the process is ended.

In step S13, the system controller 30 controls the second air-conditioning apparatus 202 to raise an evaporating temperature of the refrigerant circuit of the second air-conditioning apparatus 202.

As described above, the air-conditioning system according to Embodiment 2 includes the first air-conditioning apparatus 201 that processes an outside-air load, and supplies outdoor air into the indoor space, the second air-conditioning apparatus 202 that processes a load in the indoor space, and the system controller 30 that controls the first air-conditioning apparatus 201 and the second air-conditioning apparatus 202. The first air-conditioning apparatus 201 is capable of performing the heating and humidifying operation in which the load-side heat exchanger 45 operates as a condenser and the humidifying device 58 performs humidification. The second air-conditioning apparatus 202 includes a load-side heat exchanger that forms part of a refrigerant circuit that circulates refrigerant. The second air-conditioning apparatus 202 is capable of performing a cooling operation in which the load-side heat exchanger operates as an evaporator. The system controller 30 raises an evaporating temperature of the refrigerant circuit of the second air-conditioning apparatus 202, in the case where the outside-air processing unit 20 of the first air-conditioning apparatus 201 is performing the heating and humidifying operation, and the indoor unit 10 of the second air-conditioning apparatus 202 is performing the cooling operation.

In such a configuration, in the case where the outside-air processing unit 20 is performing the heating and humidifying operation and the indoor unit 10 is performing the cooling operation, the evaporating temperature of the refrigerant circuit of the second air-conditioning apparatus 202 is raised and the amount of dehumidification by the indoor unit 10 is thus reduced. Therefore, a necessary amount of humidification by the outside-air processing unit 20 is reduced. Since the amount of dehumidification by the indoor unit 10 is reduced, and the necessary amount of humidification by the outside-air processing unit 20 is reduced, it is possible to improve the energy saving performance of the air-conditioning system, and also ensure that the humidification performance of the outside-air processing unit 20 is not insufficient.

Embodiment 3

Figure 6:
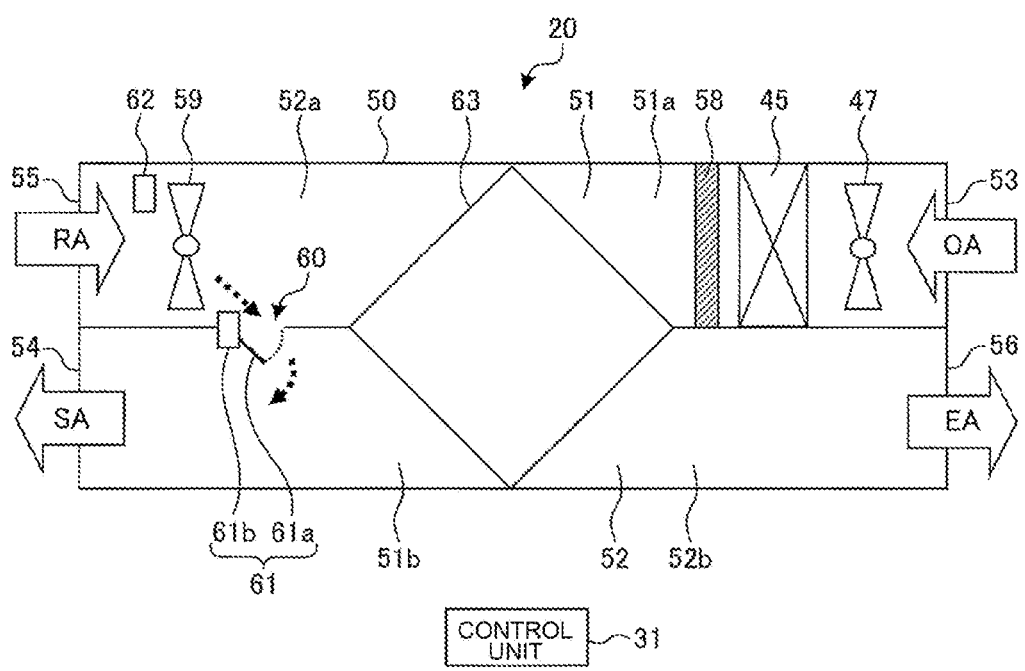
FIG. 6 is a schematic diagram illustrating a configuration of an outside-air processing unit 20 of a first air-conditioning apparatus 201 according to Embodiment 3 of the present invention.

An air-conditioning apparatus according to Embodiment 3 of the present invention will be described. FIG. 6 is a schematic diagram illustrating a configuration of the outside-air processing unit 20 of the first air-conditioning apparatus 201 according to Embodiment 3. As illustrated in FIG. 6, a sensible heat exchanger 63 is provided in the housing 50 of the outside-air processing unit 20 to transfer sensible heat between outdoor air that flows through the air supply passage 51 and indoor air that flows through the air exhaust passage 52. That is, unlike the outside-air processing unit 20 of Embodiment 1, the outside-air processing unit 20 of Embodiment 3 includes the sensible heat exchanger 63, instead of the total heat exchanger 57.

The load-side heat exchanger 45 is provided in part of the upstream-side air supply passage 51a that is located downstream of the air supply fan 47. The humidifying device 58 is provided at part of the upstream-side air supply passage 51a that is located downstream of the load-side heat exchanger 45. The other configuration of the outside-air processing unit 20 is the same as that of the outside-air processing unit 20 of Embodiment 1. Furthermore, the operations of the damper 61 and other elements of the outside-air processing unit 20 are the same as those in Embodiment 1.

As described above, in the air-conditioning apparatus according to Embodiment 3, the load-side heat exchanger 45 and the humidifying device 58 are provided in part of the air supply passage 51 that is located upstream of the sensible heat exchanger 63. It should be noted that the load-side heat exchanger 45 is an example of an air-to-refrigerant heat exchanger. The sensible heat exchanger 63 is an example of an air-to-air heat exchanger.

In the above configuration, in the case where the outside-air processing unit 20 is performing the heating and humidifying operation and the indoor unit 10 is performing the cooling operation as in Embodiment 2, the following advantages are obtained. That is, outdoor air that is heated by the load-side heat exchanger 45 of the outside-air processing unit 20 and humidified by the humidifying device 58 is cooled through heat exchange with indoor air at the sensible heat exchange 63 and is then supplied into the indoor space. Thereby, it is possible to prevent an increase in a cooling load in the indoor space, and thus reduce energy required to process an indoor load at the indoor unit 10. Therefore, the energy saving performance of the air-conditioning system can be increased.

The above embodiments can be combined and put to practical use.

REFERENCE SIGNS LIST

10 indoor unit 11 outdoor unit 12 refrigerant pipe 20 outside-air processing unit 21 outdoor unit 22 refrigerant pipe 23 indoor duct 24 outdoor duct 30 system controller 31 control unit 32 communication line 40 refrigerant circuit 41 compressor 42 four-way valve 43 heat-source-side heat exchanger 44 expansion valve 45 load-side heat exchanger outdoor fan 47 air supply fan 48 evaporating temperature sensor 49 frequency adjusting unit 50 housing 51 air supply passage 51*a* upstream-side air supply passage 51*b* downstream-side air supply passage 52 air exhaust passage 52*a* upstream-side air exhaust passage 52*b* downstream-side air exhaust passage 53 outside-air introduction port 54 air supply port 55 air return port 56 air exhaust port 57 total heat exchanger 58 humidifying device 59 air exhaust fan 60 communication passage 61 damper 61*a* plate member 61*b* drive unit 62 temperature and humidity sensor 63 sensible heat exchanger 101 above ceiling 102 indoor space 201 first air-conditioning apparatus 202 second air-conditioning apparatus EA exhaust air OA outside air RA return air SA supply air

The invention claimed is:

1. An air-conditioning apparatus comprising:
a housing in which an air supply passage and an air exhaust passage are provided, the air supply passage allowing flow of outdoor air to be supplied into an indoor space, the air exhaust passage allowing flow of indoor air to be exhausted to outside of the indoor space;
an air-to-air heat exchanger provided in the housing, and configured to transfer at least sensible heat between the outdoor air and the indoor air;
an air-to-refrigerant heat exchanger provided in the air supply passage and forming part of a refrigerant circuit configured to circulate refrigerant, the air-to-refrigerant heat exchanger being configured to transfer heat between the outdoor air and the refrigerant;
a humidifier provided in part of the air supply passage that is located downstream of the air-to-refrigerant heat exchanger, the humidifier being configured to humidify the outdoor air;
a communication passage configured to cause part of the air exhaust passage that is located upstream of the air-to-air heat exchanger and part of the air supply passage that is located downstream of the air-to-air heat exchanger to communicate with each other;
an opening/closing damper configured to open and close the communication passage, the opening/closing damper has an adjustable opening degree; and
a controller configured to control a refrigerant temperature in the air-to-refrigerant heat exchanger based on an indoor temperature in the indoor space, and to control an operation of the opening/closing damper based on an indoor humidity in the indoor space, the controller being further configured to:
receive a command which is a predetermined command to improve energy saving performance,
responsive to receiving the command, control the refrigerant circuit such that the refrigerant temperature is kept constant, and control the adjustable opening degree of the opening/closing damper based on a value representing a change in humidity, obtained by subtracting the indoor humidity from predetermined threshold humidity to control an amount of indoor air that is mixed with outdoor air.

2. An air-conditioning system comprising:
a first air-conditioning apparatus configured to process an outside-air load, and supply outdoor air into an indoor space;
a second air-conditioning apparatus configured to process a load in the indoor space; and
a system controller configured to control the first air-conditioning apparatus and the second air-conditioning apparatus,
wherein the first air-conditioning apparatus comprises:
a housing in which an air supply passage and an air exhaust passage are provided, the air supply passage allowing flow of the outdoor air, the air exhaust passage allowing flow of indoor air to be exhausted to outside of the indoor space;
an air-to-air heat exchanger provided in the housing, and configured to transfer at least sensible heat between the outdoor air and the indoor air;
an air-to-refrigerant heat exchanger provided in the air supply passage and forming part of a refrigerant circuit configured to circulate refrigerant, the air-to-refrigerant heat exchanger being configured to transfer heat between the outdoor air and the refrigerant;
a humidifier provided in part of the air supply passage that is located downstream of the air-to-refrigerant heat exchanger, the humidifier being configured to humidify the outdoor air;
a communication passage configured to cause part of the air exhaust passage that is located upstream of the air-to-air heat exchanger and part of the air supply passage that is located downstream of the air-to-air heat exchanger to communicate with each other;
an opening/closing damper configured to open and close the communication passage; and
a controller configured to control a refrigerant temperature in the air-to-refrigerant heat exchanger based on an indoor temperature in the indoor space, and to control an operation of the opening/closing damper based on an indoor humidity in the indoor space,
the first air-conditioning apparatus is allowed to perform a heating and humidifying operation in which the air-to-refrigerant heat exchanger operates as a condenser and the humidifier performs humidification,
the second air-conditioning apparatus includes a load-side heat exchanger forming part of a refrigerant circuit configured to circulate refrigerant,
the second air-conditioning apparatus is allowed to perform a cooling operation in which the load-side heat exchanger operates as an evaporator, and
the system controller is configured to:
determine whether both (i) the first air-conditioning apparatus is performing the heating and humidifying operation and (ii) the second air-conditioning apparatus is performing the cooling operation simultaneously occur;

responsive to determining that both (i) the first air-conditioning apparatus is performing the heating and humidifying operation and (ii) the second air-conditioning apparatus is performing the cooling operation simultaneously occur, raise an evaporating temperature of the refrigerant circuit of the second air-conditioning apparatus to reduce an amount of dehumidification, and leave unchanged the evaporating temperature of the refrigerant circuit of the second air-conditioning apparatus responsive to determining that both do not simultaneously occur.

* * * * *